United States Patent [19]
Shimizu et al.

[11] Patent Number: 5,918,713
[45] Date of Patent: Jul. 6, 1999

[54] WET FRICTION PLATE, WET POWER TRANSMITTING AND INTERRUPTING MECHANISM, WET CLUTCH AND LOCKUP CLUTCH

[75] Inventors: Takeo Shimizu, Kyoto; Seiji Ikeda, Osaka; Takao Fukunaga, Yawata, all of Japan

[73] Assignee: Exedy Corporation, Neyagawa, Japan

[21] Appl. No.: 08/862,384

[22] Filed: May 23, 1997

[30] Foreign Application Priority Data

May 29, 1996 [JP] Japan ................................ 8-135517
May 2, 1997 [JP] Japan ................................ 9-114545

[51] Int. Cl.$^6$ ............................ F16H 45/02; F16D 69/04
[52] U.S. Cl. .................... 192/3.29; 192/52.6; 192/107 C
[58] Field of Search ................................ 192/3.28, 3.29, 192/3.3, 52.6, 107 C

[56] References Cited

U.S. PATENT DOCUMENTS

| 2,253,316 | 8/1941 | Armitage ............................ 192/107 R |
| 4,177,885 | 12/1979 | Ross . |
| 4,436,193 | 3/1984 | Smirl ................................ 192/107 C |
| 4,619,353 | 10/1986 | Maeda . |
| 4,909,362 | 3/1990 | Miura et al. ............................ 192/3.28 |
| 5,186,292 | 2/1993 | Hageman et al. . |
| 5,211,270 | 5/1993 | Tamura et al. ........................ 192/3.29 |
| 5,314,052 | 5/1994 | Henrion . |

FOREIGN PATENT DOCUMENTS

| 399669 | 8/1924 | Germany . |
| 690 05 072T2 | 4/1994 | Germany . |
| 499882 | 1/1939 | United Kingdom . |
| 656167 | 8/1951 | United Kingdom . |

Primary Examiner—Richard M. Lorence
Attorney, Agent, or Firm—Shinjyu An Intellectiual Property Firm Osaka, Japan

[57] ABSTRACT

An elastic member made of, for instance, a rubber material, is fixed to a piston member of a lockup clutch. A wet friction facing is fixed to the elastic member. The elastic member provides a cushioning effect when the lockup clutch is engaged for controlled slippage.

2 Claims, 15 Drawing Sheets

WET FRICTION PLATE, WET POWER TRANSMITTING AND INTERRUPTING MECHANISM, WET CLUTCH AND LOCKUP CLUTCH

BACKGROUND OF THE INVENTION

A. Field of the Invention

The present invention relates to a wet friction plate within a wet power transmitting and interrupting mechanism or clutch mechanism, where the wet friction plate is provided with a cushioning member.

B. Description of the Background Art

In a wet power transmitting and interrupting mechanism such as a wet clutch and a wet brake, a wet friction facing used in a wet friction plate is made of a paper or organic material or the like.

For instance, a wet multiple plate clutch arranged in a transmission is used for changing direction and speed of torque transmission. The multiple plate clutch includes a plurality of drive plates and a plurality of driven plates which are arranged alternatively to each other in the axial direction. Each driven plate is provided at its opposite surfaces with wet friction facings, e.g., of an organic material fixed thereto. One problem with such devices is that the surfaces engaged by the drive and driven plates are expensive to manufacture in that they must be very finely machined to be flat or planar.

A lockup clutch of a torque converter is a clutch device for transmitting a torque by mechanically coupling a front cover and a turbine together, and is provided for improving a fuel consumption of a vehicle. The lockup clutch is formed of, e.g., a piston which can be coupled to the front cover and a damper mechanism for coupling the piston and a member at the turbine side together. A wet friction facing made of organic material is fixed to a side of the piston opposed to the front cover.

The damper mechanism of the lockup clutch absorbs a torque vibration caused by vibration in combustion in an engine. However, it is impossible to operate the lockup clutch in a low speed range of the vehicle, because a torque vibration at a level, which cannot be sufficiently absorbed by the damper mechanism, is generated in this low speed range. In recent years, slip control has been utilized for further improving a fuel consumption by operating the lockup clutch in a lower speed range. The slip control is performed by pressing the piston against the front cover with a small coupling force, and thereby steadily allowing controlled slippage between the piston and the front cover. When the controlled slippage is utilized, torque is transmitted through divided paths, i.e., a mechanical transmission path (the slipping surfaces) and a hydraulic transmission path. When the controlled slippage is large, torque is mechanically transmitted at a small rate, and is hydraulically transmitted at a large rate. When the controlled slippage is small, a power is mechanically transmitted at a large rate, and is hydraulically transmitted at a small rate. The controlled slippage speed is controlled by a hydraulic pressure control device which controls a difference between hydraulic pressures at opposite sides of the piston in the torque converter.

In a lockup clutch and a wet multiple plate clutch in the prior art, it is difficult to keep uniform contact in circumferential and radial directions between the wet friction facing and the friction surface. In other words, partial contact is liable to occur. This often results in the following and other problems.

(1) A shudder is liable to occur when the clutch is engaged.

(2) A wet friction facing is liable to wear to a higher extent.

(3) In the lockup clutch, leak of a lockup hydraulic pressure is liable to occur.

For reducing a partial contact, the opposed friction surface must have a high flatness, which requires a high processing accuracy and therefore increases a cost.

The slip control of the lockup clutch in the torque converter suffers from the following problem. In the prior art, the slip control is performed, for example, in a vehicle speed range from 30 to 48 km/h with a fourth gear position. Although it is preferable to perform the slip control in a lower vehicle speed range for improving a fuel consumption, this results in the following difficulties.

In a low speed range, it is necessary to change a ratio of the power transmitted through a hydraulic path to a large extent, so that it is necessary to increase the slip rotation speed to a certain extent. In order to increase the slip rotation speed to a certain extent, a difference between hydraulic pressures at opposite sides of the piston member must be extremely reduced. When the pressure difference is finely controlled in this state, the piston may suddenly move toward the front cover due to change in hydraulic pressure difference. When this occurs, the torque variation is mechanically transmitted to the output member. For the above reason, it is difficult to perform the slip control at a low speed range, e.g., under 30 km/h.

SUMMARY OF THE INVENTION

An object of the invention is to suppress a partial contact in a wet power transmitting and interrupting mechanism.

Another object of the invention to enable slip control of a lockup clutch at a vehicle speed range lower than that in the prior art.

According to a first aspect of the invention, a wet friction plate includes a plate member, a cushioning member fixed to the plate member, and a wet friction facing fixed to the cushioning member.

When the wet friction plate is pressed against another member, the cushioning member elastically deforms. Thereby, the wet friction facing is brought into substantially uniform contact with another member through its entire surface. Since partial contact is prevented in this manner, partial wear of the wet friction facing is prevented.

According to a second aspect, a wet power transmitting and interrupting mechanism includes first and second friction plates. The second friction plate includes a plate member relatively movable toward and away from the first friction plate, a cushioning member fixed to the plate member, and a wet friction facing fixed to the cushioning member and opposed to the first friction plate.

When the first and second friction plates move toward each other and are coupled together, the second wet friction facing of the second plate is brought into contact with the first plate, and the cushioning member elastically deforms. Thereby, the wet friction facing is brought into substantially uniform contact with the first friction plate through its entire surface. Since partial contact is prevented in this manner, partial wearing of the wet friction facing is reduced.

According to a third aspect of the invention, a wet power transmitting and interrupting mechanism includes a plurality of first friction plates, a plurality of second friction plates and an operating mechanism. The second friction plates each include a plate member, cushioning members fixed to the opposite sides of the plate member, respectively, and wet friction facings fixed to the cushioning members, respectively, and are arranged alternatively to the first friction plates. The operating mechanism is provided for coupling and releasing the first and second friction plates with and from each other.

When the operating mechanism couples the first and second friction plates together, the wet friction facing of the second plate is brought into contact with the first plate, and the cushioning member elastically deforms. As a result, the wet friction facing is brought into substantially uniform contact with the first friction plate through its entire surface. Since partial contact is prevented in this manner, shudder during an engaging operation of the clutch can be suppressed. Partial wear of the wet friction facing can be reduced.

According to a fourth aspect, a wet clutch includes a first rotary member, a second rotary member and a plate. The first and second rotary members are relatively movable toward and away from each other. The plate includes a plate member axially movably disposed between the first and second rotary members, and a cushioning member fixed to the first plate member.

When the second rotary member moves toward the first rotary member, the plate is held between them, and the cushioning member elastically deforms. Thereby, shudder during an engaging operation of the clutch is suppressed. According to this structure in which the plate having the cushioning member is arranged between the first and second rotary members, it is not necessary to fix the friction facing to the cushioning member, so that the whole structure can having an improved durability.

According to a fifth aspect of the invention, the wet clutch of the fourth aspect further has such features that the plate is relatively non-rotatably engaged with the first rotary member, the cushioning member is fixed to a side of the plate member opposed to the first rotary member, and the wet clutch further includes a wet friction facing fixed to the second rotary member and opposed to the first plate. The plate is relatively non-rotatably engaged with the first rotary member. Since no relative rotation occurs between the first rotary member and the plate, the cushioning member can have a long lifetime.

According to a sixth aspect of the invention, a lockup clutch for mechanically transmitting a torque from an input front cover of a torque converter to an output member includes a piston member, a cushioning member and a wet friction facing. The piston member is disposed near the front cover, and is movable toward the front cover in accordance with control of a hydraulic pressure in the torque converter. The cushioning member is fixed to a side of the piston member opposed to the front cover. The wet friction facing is fixed to the cushioning member and is opposed to the front cover.

When the piston member is pressed against the front cover, the cushioning member elastically deforms. Thereby, the wet friction facing is brought into substantially uniform contact with the first plate through its entire surface. Since partial contact is prevented in this manner, shudder during an engaging operation of the clutch can be suppressed. Partial wear of the wet friction facing can also be suppressed. Further, according to this structure in which the cushioning member is arranged between the front cover and the piston member, it is not necessary to fix the friction facing to the cushioning member, so that an entire durability can be improved.

According to a seventh aspect of the invention, a lockup clutch for mechanically transmitting a torque from an input front cover of a torque converter to an output member includes a piston member, a wet friction facing and a plate. The piston member is opposed to a side of the front cover, and is movable toward the front cover in accordance with control of a hydraulic pressure in the torque converter. The wet friction facing is fixed to a side of the piston member opposed to the front cover. The plate is arranged between the front cover and the wet friction facing, and has a plate member and a cushioning member fixed to a side of the plate member opposed to the front cover.

When the piston member moves toward the front cover, the plate is held between the piston member and the front cover. Thereby, the cushioning member elastically deforms. Therefore, the wet friction facing is brought into substantially uniform contact with the plate through its entire surface. Since partial contact is prevented in this manner, shudder during an engaging operation of the clutch is suppressed. Also, partial wear of the wet friction facing is suppressed. According to this structure in which the plate having the cushioning member is arranged between the front cover and the piston member, it is not necessary to fix the friction facing to the cushioning member, so that an entire durability can be improved.

According to an eighth aspect of the invention, the lockup clutch of the seventh aspect further has such features that the plate is engaged relatively non-rotatably but axially movably with the front cover. Since a relative rotation does not occur between the front cover and the plate, the cushioning member can have a long lifetime.

According to a ninth aspect of the invention, the structure in any one of the preceding aspects 6 to 8 has such a feature that the cushioning member forms a fluid passage allowing radial passing of fluid. Therefore, the fluid flows radially at the vicinity of the cushioning plate even when the clutch is engaged, and thereby cools a clutch coupling part.

According to the lockup clutches of the sixth to ninth aspects, the cushioning plate suppresses rapid or sudden engagement of the clutch, so that a slip control can be performed in a lower vehicle speed range.

The foregoing and other objects, features, aspects and advantages of the present invention will become more apparent from the following detailed description, when taken in conjunction with the accompanying drawings.

DESCRIPTION OF THE PREFERRED EMBODIMENTS

FIRST EMBODIMENT

Figure 1:
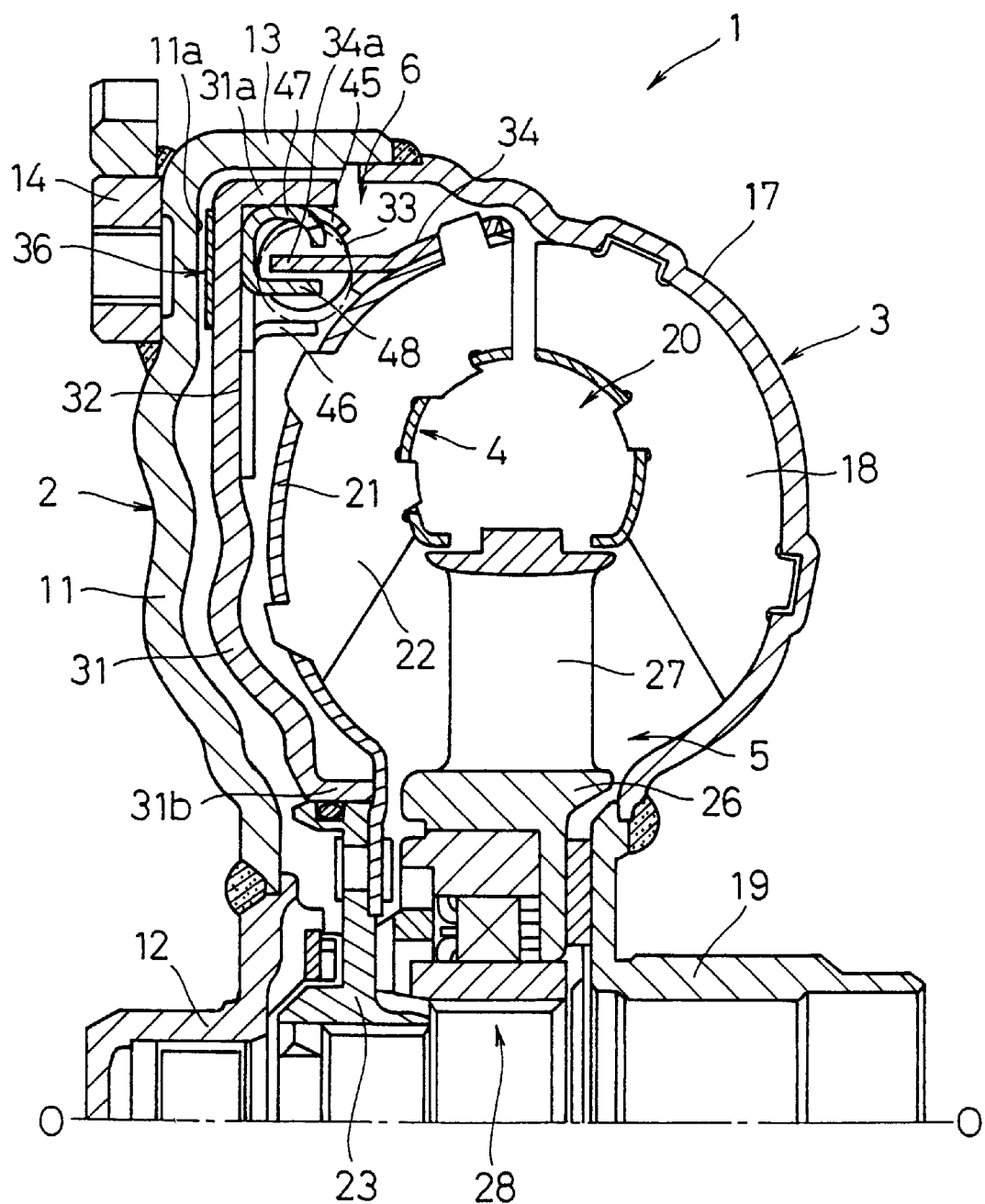
FIG. 1 is a fragmentary, schematic cross section of a torque converter provided with a lockup clutch in accordance with a first embodiment of the present invention.
Figure 2:
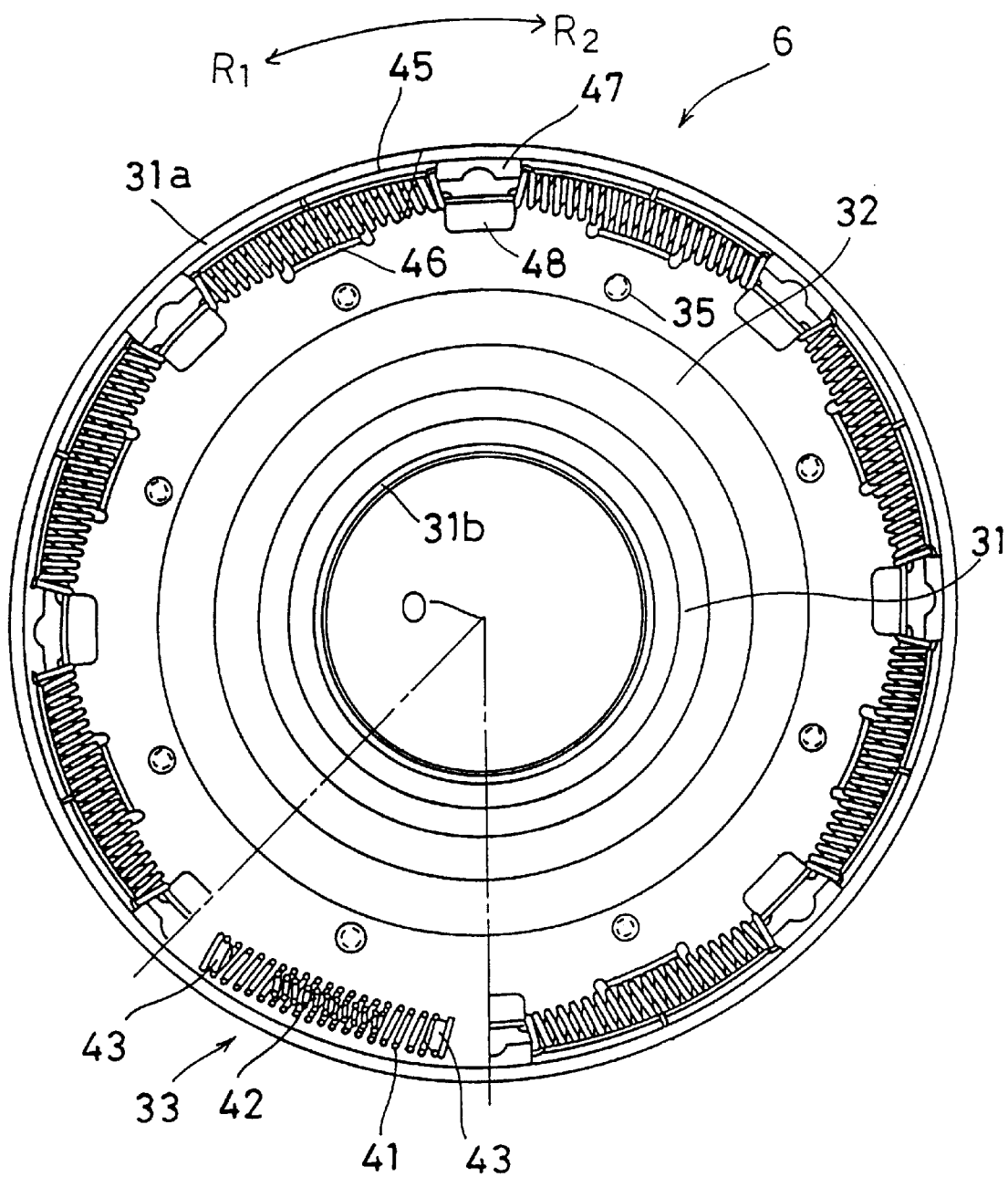
FIG. 2 is a front end elevational view of the lockup clutch of the torque convertor depicted in FIG. 1, with portions of the torque convertor removed for clarity.

A torque converter 1 is shown in FIG. 1 in accordance with a first embodiment of the present invention. The torque convertor 1 includes a front cover 2, an impeller 3, a turbine 4, a stator 5 and lockup clutch 6. Although not shown, an engine is disposed at a left-hand side of FIG. 1, and a transmission is disposed at a right-hand side of FIG. 1. Hereinafter, the left side of FIG. 1 will be referred to as the engine side and the right side of FIG. 1 will be referred to as the transmission side. In FIG. 1, O-O represents a rotation axis of the torque converter 1. In FIG. 2, an arrow R1 represents a rotation direction of a crankshaft of the engine, and an arrow R2 represent a reverse direction, opposite the rotation direction of a crankshaft of the engine.

The impeller 3 includes an impeller shell 17. The front cover 2 and the impeller shell 17 of the impeller 3 are fixed together at their radially outer portions to define an annular chamber 20 filled with a working fluid. The front cover 2 is formed with a front cover body 11 which has a circular plate-like shape and a hub 12 welded to an inner periphery of the front cover body 11. The front cover body 11 is provided at its outer periphery with an outer cylindrical portion 13 extending toward the transmission side. An end of the outer cylindrical portion 13 is welded to an outer periphery of the impeller shell 17. The front cover body 11 is provided on an inner surface, proximate a radially outer portion with a flat annular friction surface 11a within the annular chamber 20 (i.e., interior of the torque converter). A mounting means is provided on the front cover body 11, for instance, a plurality of nuts 14 are welded to a side of the radially outer portion of the front cover body 11 opposed to the engine.

The impeller 3, turbine 4 and stator 5 are vane wheels, respectively. The impeller 3 is formed with the impeller shell 17, as described above, and includes a plurality of impeller blades 18 fixed to the inner side of the impeller shell 17 and an impeller hub 19 fixed to the inner periphery of the impeller shell 17.

The turbine 4 is disposed in the annular chamber 20 and is opposed to the impeller 3. The turbine 4 is formed with an annular turbine shell 21, a plurality of turbine blades 22 fixed to a side of the turbine shell 21 opposed to the transmission (i.e., opposed to the impeller 3), and a turbine hub 23 fixed by rivets to the inner peripheral portion of the turbine shell 21. The turbine hub 23 is spline-engaged with a main drive shaft (not shown) which extends from the transmission (not shown).

The stator 5 is formed with an annular stator carrier 26 and a plurality of stator blades 27 arranged at the outer periphery of the stator carrier 26. The stator 5 is fixed through a one-way clutch 28 to a stationary shaft (not shown) which extends from the transmission.

The lockup clutch 6 is provided for mechanically transmitting a torque of the front cover 2 to the turbine 4, and functions as a wet clutch and a vibration damper. The lockup clutch 6 includes a piston member 31, a retaining plate 32, a plurality of coil springs 33 and a driven plate 34.

The piston member 31 has a circular plate-like shape, and is disposed between the front cover body 11 and the turbine shell 21 of the turbine 4. The piston member 31 can be move toward and away from the front cover 2 in response to changes in hydraulic pressures at the axially opposite sides thereof. The piston member 31 has outer and inner cylindrical portions 31a and 31b which extend toward the transmission side. The inner cylindrical portion 31b is rotatably fitted around the outer peripheral surface of the turbine hub 23, but is axially movable from a disengaged position shown in FIG. 1 to an engaged position close to the front cover body 11. A friction coupling portion 36 has a circular plate-like shape and is disposed on a radially outer surface of the piston member 31 opposed to the friction surface 11a of the front cover body 11, as is shown in FIG. 1.

Figure 3:
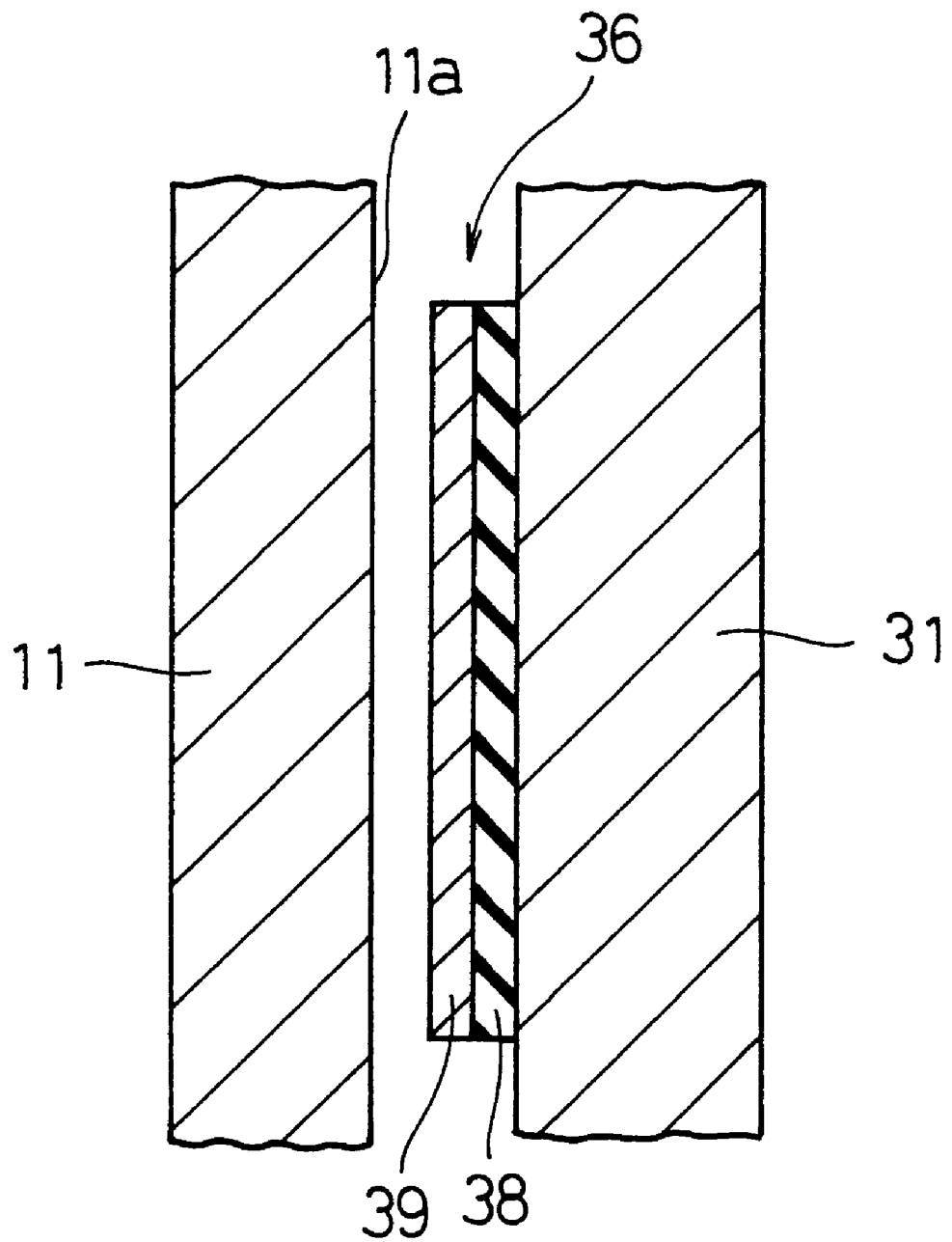
FIG. 3 is a fragmentary, cross section of a portion of the torque convertor depicted in FIG. 1, on a slightly enlarged scale.

As specifically shown in FIG. 3, the friction coupling portion 36 includes an annular cushioning member 38 which is adhered to the piston member 31 and a wet friction facing 39 adhered to the cushioning member 38. The wet friction facing 39 positioned adjacent to the friction surface 11a. In the first embodiment, the cushioning member 38 is made of rubber, and the wet friction facing is made of an organic material. As described above, the piston member 31 is a plate member forming a wet friction plate together with the cushioning member 38 and the wet friction facing 39. A first friction plate is formed of the front cover 2, and a second friction plate is formed of the piston member 31 (plate member), the cushioning member 38 and the wet friction facing 39. The first and second friction plates are movable toward and away from each other, and form a wet power transmitting and interrupting mechanism. Further, in the first embodiment, the wet friction facing 39 fixed to the piston member 31 and the friction surface 11a of the front cover 2 form a clutch mechanism of the lockup clutch 6.

The retaining plate 32 is fixed to the piston member 31 for holding the coil springs 33, as described below. The retaining plate 32 is an annular plate member, and is arranged radially inside the outer cylindrical portion 31a. The radially inner portion of the retaining plate 32 is fixed to the piston member 31 by a plurality of circumferentially equally spaced rivets 35, as shown in FIG. 2. The retaining plate 18 is provided at its radially outer portion with a plurality of circumferentially equally spaced outer supporting portions 45 and a plurality of circumferentially equally spaced inner supporting portions 46. Coil springs 33 are arranged between these outer and inner supporting portions 45 and 46, as shown in FIGS. 1 and 2. Opposite ends of each coil spring 33 are seated on spring seats 43. The coil springs 33 at circumferentially alternate positions each are formed of a first coil spring 41 and a second coil spring 42 arranged inside the spring 41. The retaining plate 32 is provided with first and second end supporting portions 47 and 48 which are in contact with the spring seats 43 of the coil springs 33, respectively. Each first supporting portion 47 is formed by partially cutting and bending the outer supporting portion 45. Each second supporting portion 48 is formed by partially cutting and bending the inner supporting portion 46.

The driven plate 34 is an annular plate member, and is welded to the outer peripheral portion of the turbine shell 21 of the turbine 4. The driven plate 34 has a plurality of engagement portions 34a extending axially toward the engine. Each engagement portion 34a is located between the circumferentially adjacent coil springs 33 and more specifically between the circumferentially adjacent spring seats 43. Owing to the above structure, a torque of the piston member 31 and the retaining plate 32 can be transmitted to the driven plate 34 and the turbine 4 through the plurality of coil springs 33. When the lockup clutch is engaged, the retaining plate 32 functions as an input member, the driven plate 34 functions as an output member, and the coil springs 33 function as cushioning members between the input and output members. In this manner, a damper mechanism of the lockup clutch 6 is achieved.

An operation will be described below.

Torque is supplied from the crankshaft of the engine to the front cover 2 through, for instance, a flexible plate (not shown). This torque is transmitted to the impeller shell 17. Thereby, the impeller 3 rotates, and the working fluid flows from the impeller 3 to the turbine 4. Owing to the flow of the working oil, the turbine 4 rotates, and the torque of the turbine 4 is transmitted to the main drive shaft (not shown) through the turbine hub 23.

In the manner described above, the torque converter 1 operates to transmit hydraulically the torque through the working fluid. Since the torque is transmitted through fluid, a torque transmission efficiency is lower than that in the case where the torque is mechanically transmitted through the lockup clutch 6 as described below. Therefore, fuel consumption of a vehicle equipped with the torque converter 1 can be improved by reducing a ratio of the hydraulically transmitted torque and increasing a ratio of the torque transmitted through the lockup clutch 6, as is described below. However, the hydraulic coupling can absorb a vibration more effectively.

The operation of the lockup clutch 6 described below. First, description will be given on the operation of the lockup clutch 6 without the lockup slip control operation previously described.

When a speed ratio of the torque converter 1 (i.e., a ratio of the output rotation speed to the input rotation speed) increases such that the main drive shaft reaches a high, constant rotation speed, the lockup clutch may start operation. More specifically, the working oil between the piston member 31 and the front cover 2 is quickly drained through an interior of the main drive shaft (via controls not shown in the transmission). Thereby, a pressure difference is created between opposite sides of the piston member 31, so that the piston member 31 is forced to move toward the front cover 2. The fluid pressure moves the piston member 31 into engagement with the front cover body 11, and the friction coupling portion 36 is forced against the friction surface 11a of the front cover body 11. Thereby, torque from the front cover body 11 is transmitted to the piston member 31, and is transmitted therefrom to the turbine 4 through the retaining plate 32, coil springs 33 and driven plate 34. The torque is transmitted from the turbine 4 to the main drive shaft (not shown) extending from the transmission.

The plurality of coil springs 33 absorb shocks and torsional vibration which occur in the clutch engaging operation. Without the lockup slip control being performed, however, the vibration which occurs at the time of clutch engagement must be suppressed within an allowed range by utilizing only damping properties of the coil springs 33 of the lockup clutch 6. This necessarily restricts the speed ratio range of the torque converter 1 in which the lockup clutch 6 can operate.

In the clutch engaging operation described above, the cushioning member 38 of the friction coupling portion 36 provides a cushioning effect. Consequently, the wet friction facing 39 is brought into uniform contact with the friction surface 11a through its entire circumference with more uniform contact as compared to prior art configurations without a cushioning member. Since the effects of partial contact is reduced, as described above, the following effects can be achieved.

(1) Shudder during a clutch engaging operation is suppressed.

(2) Partial wear of the wet friction facing 39 is suppressed.

(3) It is not necessary to finely machine the flatness of the friction surface 11a of the front cover body 11. Therefore, the manufacturing costs can be reduced.

(4) Layer separation of the wet friction facing, which is liable to occur in the prior art, can be suppressed.

(5) Leakage of the lockup hydraulic pressure at the friction coupling portion can be suppressed.

Generally, torque converters are liable to undergo some deformation during high speed rotation, because a hydraulic pressure increases due to a centrifugal force. This results in deformation of the friction surface, such as the friction surface 11a, of the front cover body, so that partial contact of the wet friction facing is liable to occur. In the first embodiment of the present invention, however, the effects of partial contact of the wet friction facing are suppressed due cushioning layer. As a result, the front cover and the impeller shell having a reduced thickness can be employed in the torque converter, and the weight and cost can be reduced.

Description will now be given on an operation of the lockup clutch 6 where a lockup slip control operation is effected.

When the speed ratio (the ratio of the output rotation speed to the input rotation speed) of the torque converter 1 increases, the lockup clutch 6 operates and the lockup slip control operation is performed. In the lockup slip control operation the fluid pressure between front cover body 11 and piston member 31 is at first only slightly reduced so that there is intentional slippage between the front cover body 11 and the piston member 31. The speed ratio at which lockup clutch engagement can occur may be set to a smaller value in the present invention than in a torque convertor where the that has no cushioning member.

In the present invention, a control system (not shown) monitors the rotation speed of the engine and the output rotation speed. Based on the information obtained by the monitoring, feedback control is performed to control the pressure between the piston member 31 and the turbine 4, i.e., the pressure in the torque converter 1 except for the space between the piston member 31 and the front cover 2. Thereby, pressure which is applied against the piston member 31 from the turbine 4 side is controlled. In this control operation, the hydraulic pressure is increased when the rotation speed is lower than a control target rotation speed, and. the hydraulic pressure is reduced when the rotation speed is higher than the control target rotation speed. Thereby, a difference between the input and output rotation speeds is controlled to attain a predetermined difference. Under this control, the wet friction facing 39 and the friction surface 11a slide on each other during torque transmission. In this manner, the lockup slip control can absorb the vibration by the damper function owing to slip of the wet friction facing 39 in addition to the damper function of the coil springs 33 of the lockup clutch 6.

The slip control operation which is performed in the lockup clutch 6 can specifically achieve the following effect. Even when the slip rotation speed is kept at a relatively large value in the low vehicle speed range, sudden engagement of the clutch is unlikely to occur. For example, the difference between the hydraulic pressures at the opposite sides of the piston member may be very small and may be finely controlled, so that the piston may be rapidly pulled toward the front cover owing to variation in hydraulic pressure difference. Even in this case, the cushioning member 38 prevents the sudden clutch engagement. Consequently, the slip control can be started at a vehicle speed range lower than that in the prior art.

Further, a rate of variation in the transmitted torque can be reduced owing to transmission of the torque to the turbine through the cushioning member 38. Thus, a torsional vibration can be suppressed.

MODIFICATION TO THE FIRST EMBODIMENT

Figure 4:
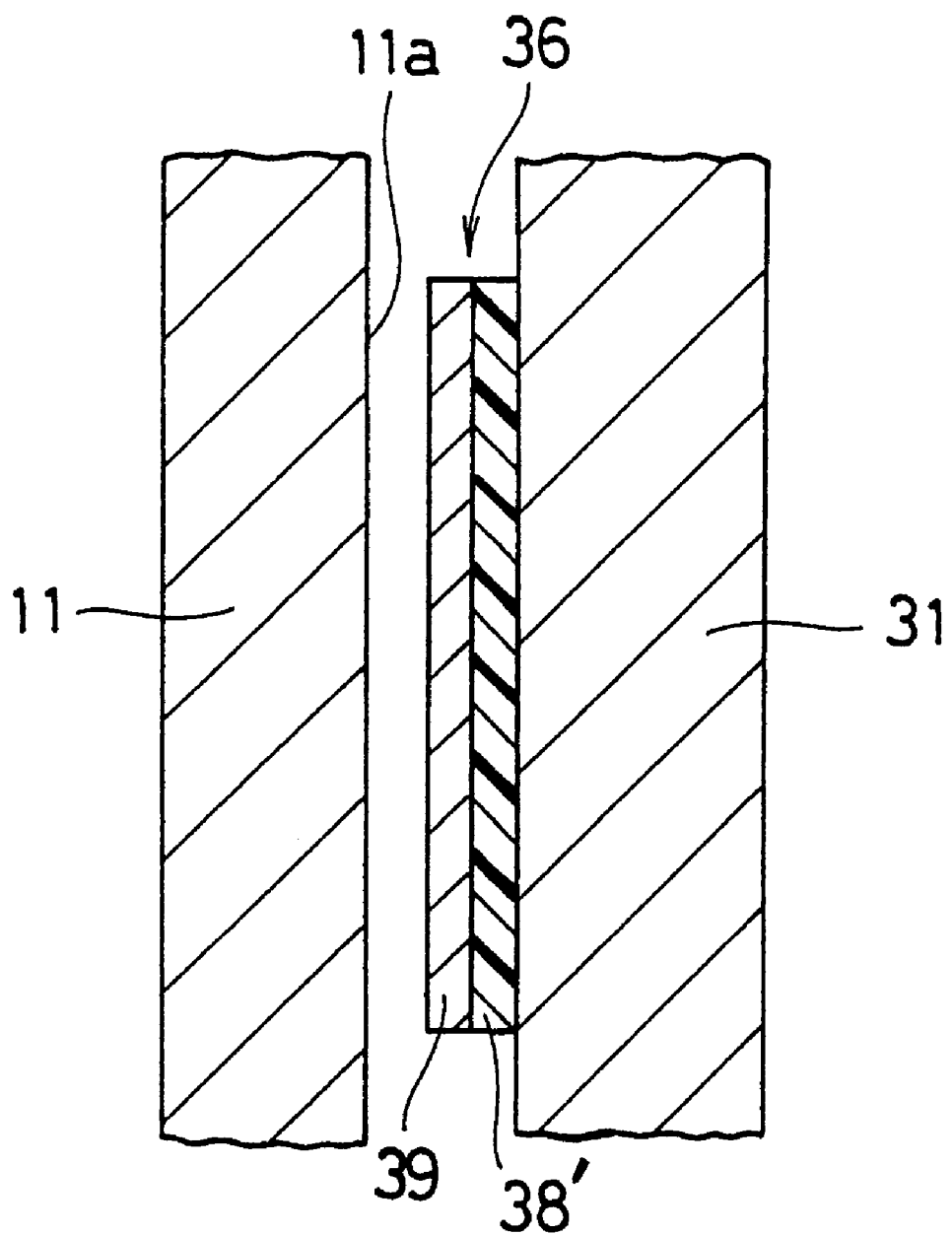
FIG. 4 is a fragmentary, cross section, similar to FIG. 3, showing a modification to the embodiment depicted in FIG. 3.

As shown in FIG. 4, the cushioning member 38 may alternately be made of a resin material 38'. However, the cushioning member 38 may be made of a material other than rubber and resin.

The cushioning member may be formed of a spring, such as a wavy spring which has a substantially wavy or corrugated form extending in the circumferential direction.

Figure 5:
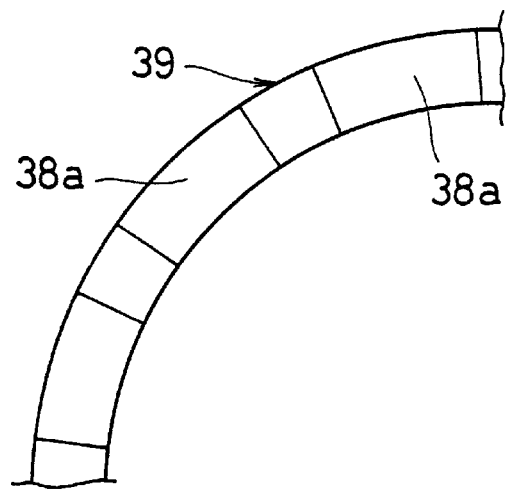
FIG. 5 is a fragmentary, rear end view of a cushioning member and a wet friction facing of the modification shown in FIG. 4.

As shown in FIG. 5, the single cushioning member described above may be replaced with a plurality of members 38a which are circumferentially spaced from each other. Between the plurality of members 38a, there is formed fluid passages 39 allowing radial flow of fluid. In this case, the working oil can move radially on the friction surface even when the clutch is engaged, so that the friction surface can be cooled efficiently. In particular, when the slip control operation is performed, a large heat is generated from the frictionally engaged surfaces since there is intentional slippage, so that provision of the fluid passages for cooling the friction surfaces contributes to increase of the lifetime of the lockup clutch.

The wet friction facing may be made of carbon or metal.

The wet friction facing 39 and the cushioning member 38 may be mechanically coupled together.

SECOND EMBODIMENT

Figure 6:
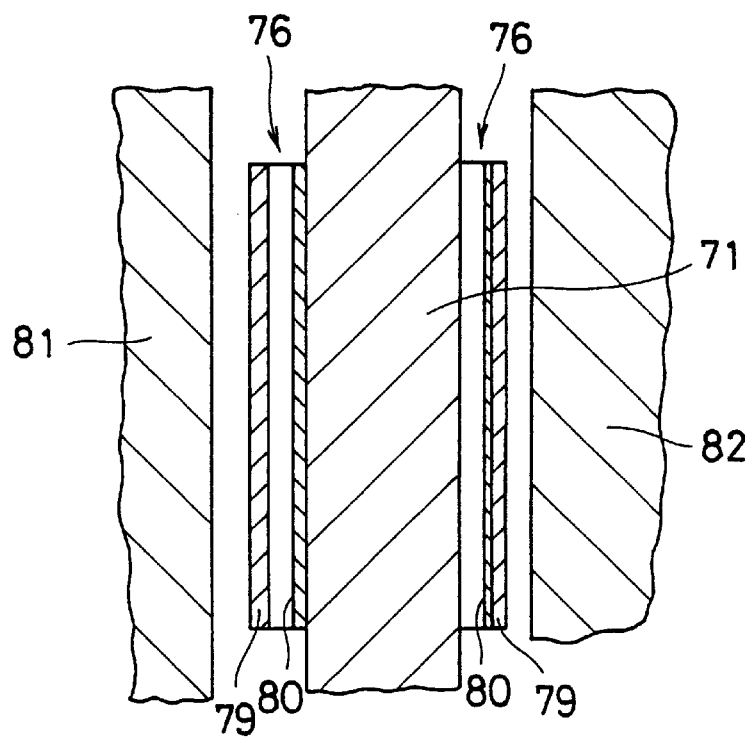
FIG. 6 is a fragmentary, cross section of a clutch coupling portion of a wet single-plate clutch in accordance with a second embodiment of the present invention.

FIG. 6 shows a clutch coupling portion, e.g., of a wet single-plate clutch. Friction coupling portions 76 are fixed to the opposite surfaces of the clutch plate 71. Each friction coupling portion 76 is formed of a wavy spring 80 fixed to the clutch plate 71 and a wet friction facing 79 fixed to the wavy spring 80. In this manner, the clutch plate 71 (plate member), the wavy spring 80 (cushioning member) and the wet friction facing 79 form one wet friction plate.

A flywheel 81 and a pressure plate 82 are arranged at opposite sides of the friction coupling portion.

This friction coupling 76 can achieve effects similar to that of the first embodiment. The spring for achieving the cushioning effect in the friction coupling portion may not be restricted to the wavy spring. The cushioning member of the wet single-plate clutch may be made of a member or material such as rubber or resin described above.

THIRD EMBODIMENT

Figure 7:
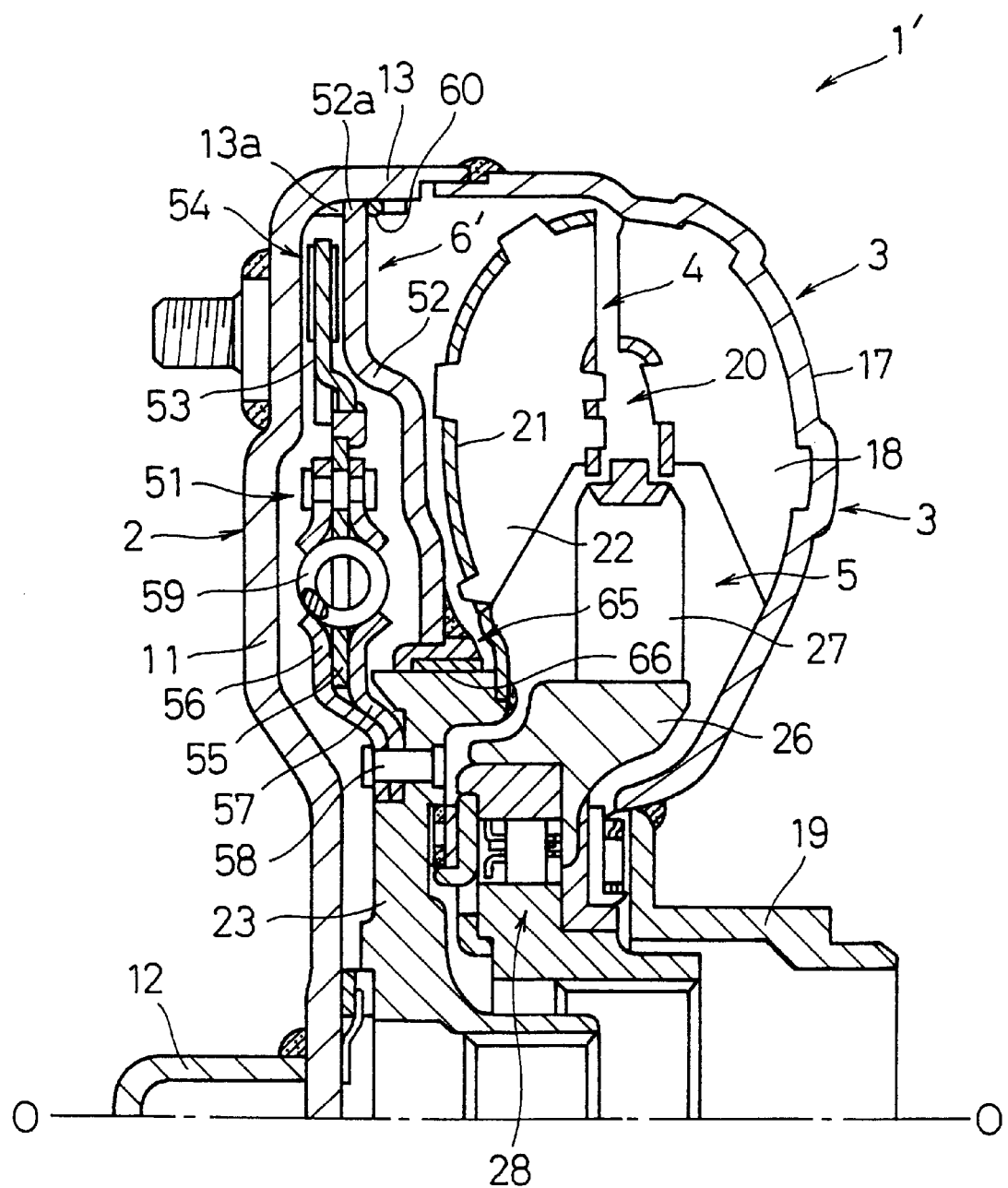
FIG. 7 is a fragmentary, cross section view similar to FIG. 1, showing a torque convertor in accordance with a third embodiment of the present invention.

The torque converter 1' shown in FIG. 7 has many features and structural elements that are generally the same as those described with respect to the first embodiment. Therefore, only those features which differ, such as the lockup clutch in the third embodiment, will be described below. The front cover body 11 in the third embodiment is provided at an inner peripheral surface of the outer cylindrical portion 13 with a plurality of engagement projections 13a which are circumferentially equally spaced from each other and each are parallel with the center line O-O.

The lockup clutch 6' is disposed between the front cover body 11 and the turbine shell 21 of the turbine 4. The lockup clutch 6' is basically formed of a circular piston plate or member 52 and a clutch disc assembly 51.

The clutch disk assembly 51 is adjacent to the front cover body 11. The clutch disk assembly 51 is basically formed of a clutch coupling portion 54, a clutch plate 55, driven plates 56 and 57, and coil springs 59. The clutch coupling portion 54 is disposed near the friction surface 11a of the front cover body 11.

Figure 8:
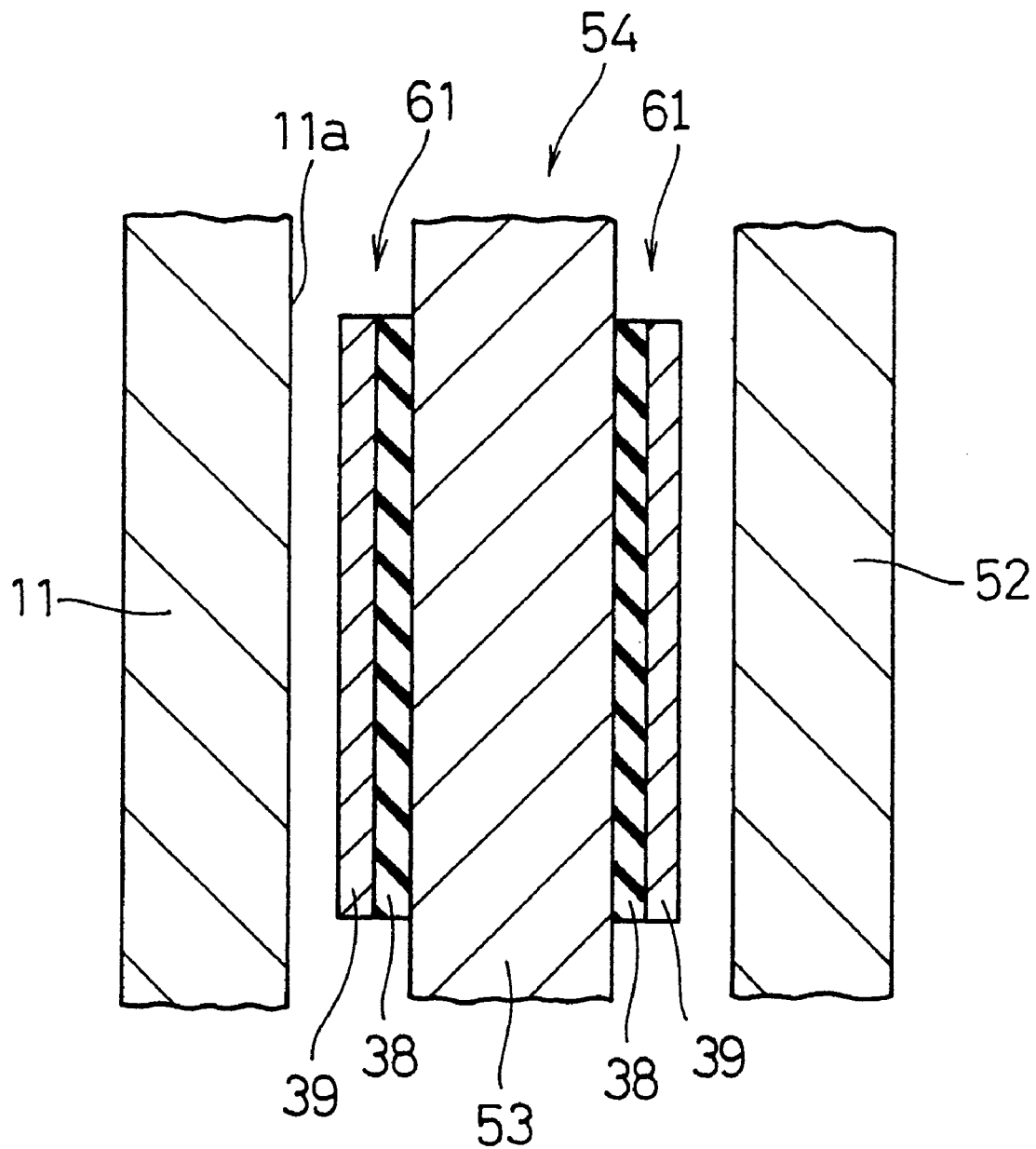
FIG. 8 is a fragmentary, cross section view similar to FIG. 3, showing portions of the torque convertor depicted in FIG. 7 (the third embodiment) on a slightly enlarged scale.

As specifically shown in FIG. 8, the clutch coupling portion 54 is formed of a plate member 53 and friction coupling portions 61 arranged at the opposite sides of the plate member 53. Each first friction coupling portion 61 is formed of the cushioning member 38 and the wet friction facing 39 fixed to the cushioning member 38. As described above, the wet friction plate is formed of the plate member 53, cushioning member 38 and wet friction facing 39.

The inner peripheral portion of the plate member 53 is fixed to the clutch plate 55. The driven plates 56 and 57 are arranged at opposite sides of the clutch plate 55. Inner peripheral portions of the driven plates 56 and 57 are fixed to the turbine hub 23 by a plurality of rivets 58. A plurality of coil springs 59 are arranged in windows formed at the plates 55, 56 and 57. The coil springs 59 elastically couple the clutch plate 55 to the driven plates 56 and 57 to allow relative rotation through a predetermined angular displacement range.

The piston member 52 is provided at its outer periphery with spline teeth or portions 52a which engage with engagement projections 13a formed at the outer cylindrical portion 13. Owing to this engagement, the piston member 52 rotates together with the front cover 2, but is axially movable with respect to the front cover 2. A wire ring 60 is arranged at portions of the engaging projections 13a of the front cover 2 near the transmission side. This wire ring 60 restricts movement of the piston member 52 toward the transmission side.

A cylindrical member 65 is welded to the inner periphery of the piston member 52. The cylindrical member 65 is rotatably and axially movably carried on the outer peripheral surface of the turbine hub 23 through a bushing 66.

An operation of the lockup clutch 6 is described below. When the working oil in the space between the piston member 52 and the front cover body 11 is drained, the piston member 52 moves toward the front cover body 11 to press the clutch coupling portion 54 against the friction surface 11a of the front cover body 11. Since the clutch coupling portion 54 has the frictionally engaging surfaces at its opposite surfaces, the transmitted torque can be large.

In this embodiment, the cushioning effect by the clutch coupling portion 54 and the effect achieved thereby are similar to those of the foregoing embodiments.

FOURTH EMBODIMENT

Figure 9:
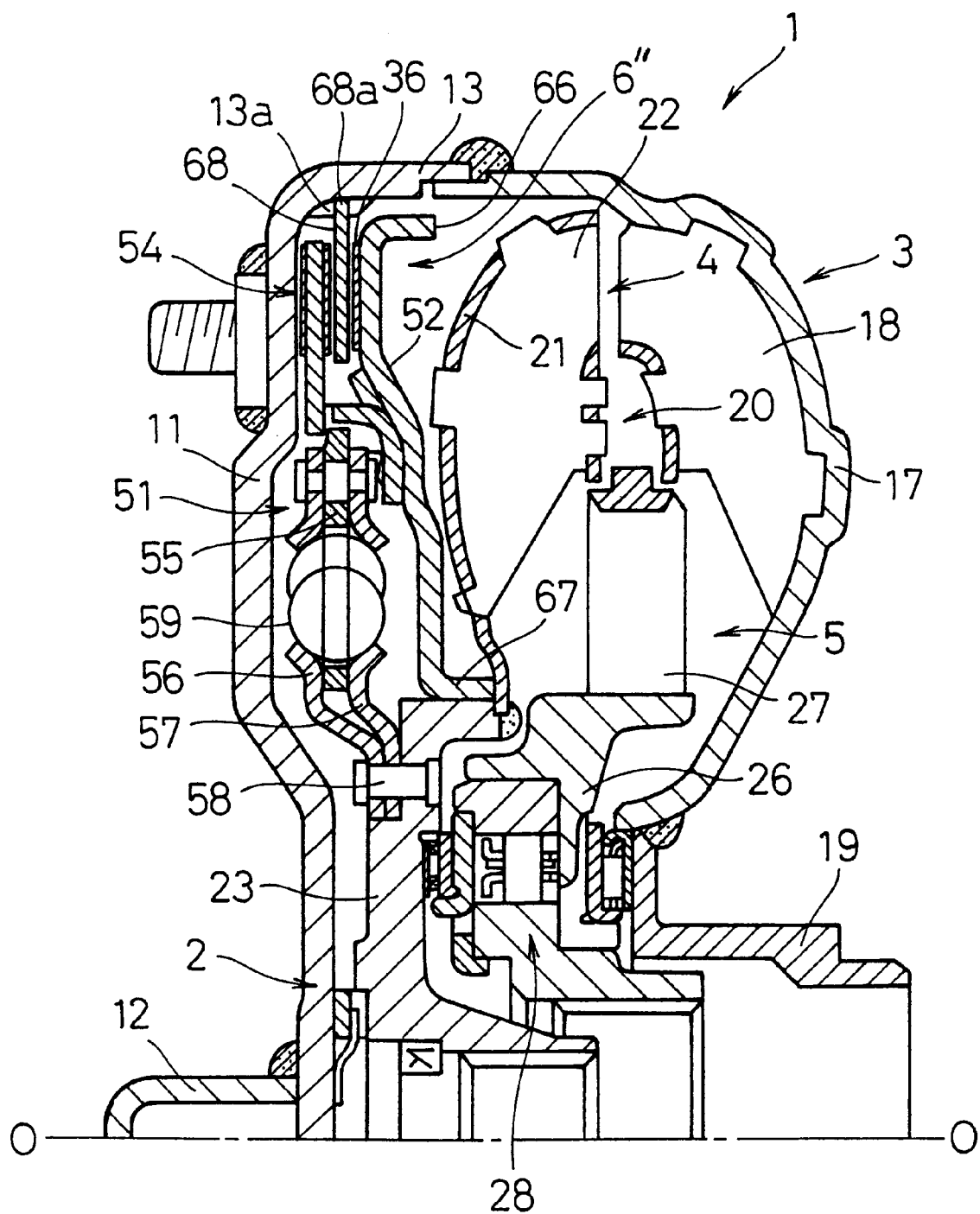
FIG. 9 is a fragmentary, cross section view similar to FIG. 1, showing a torque convertor in accordance with a fourth embodiment of the present invention.

The torque converter 1 shown in FIG. 9 has many features that are similar to those of the foregoing embodiments. Therefore, only those elements and features that differ will be described below.

The lockup clutch 6" is basically formed of the clutch disk assembly 51 similarly to that of the second embodiment as well as the piston member 52 and the plate 68. The clutch disk assembly 51 is provided at its radially outer portion with the clutch coupling portion 54, similar to the second embodiment. The piston member 52 is engaged with the clutch disk assembly 51 for rotation therewith but may under go limited axially movement with respect thereto. The friction coupling portion 36 is generally the same as that in the first embodiment and is formed on a radially outer portion of the piston member 52 facing the engine side. The plate 68 is arranged between the clutch coupling portion 54 and the friction coupling portion 36. A spline portion 68a formed at the outer periphery of the plate 68 is engaged non-rotatably and axially movably with the engaging projections 13a formed at the inner peripheral surface of the outer cylindrical portion 13 of the front cover body 11.

When working oil is drained from the space between the front cover body 11 and the piston member 52, the piston member 52 moves toward the engine to press the plate 68 against the clutch coupling portion 54, which is in turn pressed against the friction surface 11a. In this structure, since the torque is frictionally transmitted through three sets of surfaces, the torque transmission capacity can be large. The effect achieved by the cushioning function at the friction coupling portion 36 and the clutch coupling portion 54 is similar to that in the foregoing embodiments.

FIFTH EMBODIMENT

Figure 10:
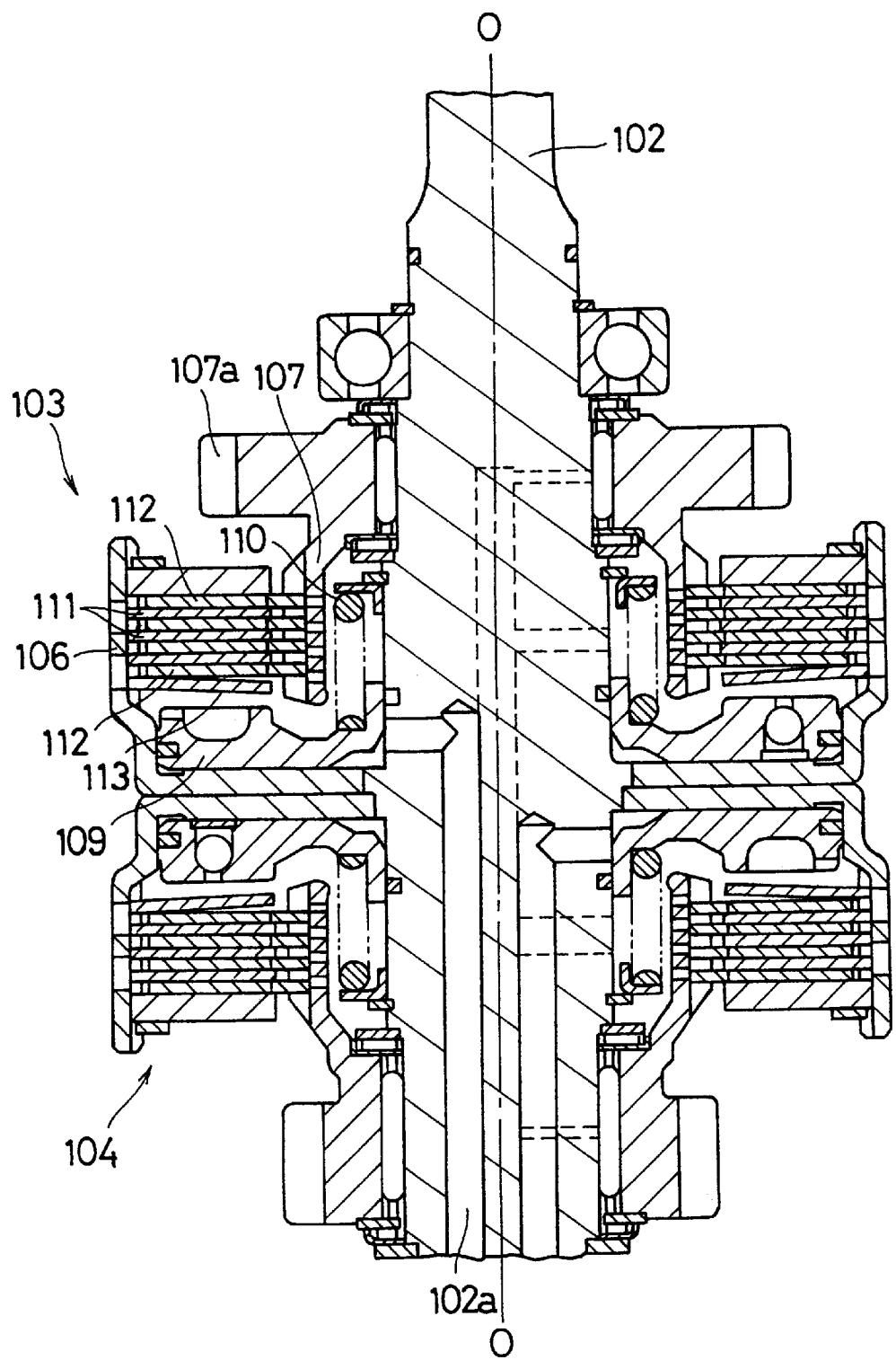
FIG. 10 is a schematic cross section of a wet multiple plate clutch installed on an intermediate shaft of a transmission in accordance with a fifth embodiment of the present invention.

FIG. 10 is a fragmentary cross section of a transmission employed, e.g., in a rough terrain crane or truck.

An intermediate shaft 102 is coupled to a clutch 103 for reverse driving and a clutch 104 for forward driving. Since the clutch 103 and the clutch 104 are generally of the same design and function, only the clutch 103 for reverse driving will be described below in detail but is equally applicable to both clutches 103 and 104.

The reverse drive clutch 103 is a wet multiple plate clutch, and is formed of an outer drum 106, an inner drum 107, a plurality of drive plates 111, a plurality of driven plates 112, a cushioning plate 113, a piston 109 and a coil spring 110.

The outer drum 106 is fixed to the intermediate shaft 102. The plurality of drive plates 111 are spline-engaged to the inner peripheral surface of the outer drum 106. The inner drum 107 is disposed radially inside and coaxially with the outer drum 106, and is rotatably supported on the intermediate shaft 102. The inner drum 107 has a gear 107a. The gear 107a is engagable with another gear (not shown) that is in turn coupleable to an input shaft.

The plurality of drive plates 111 (first friction plates) have outer peripheries which are engaged with the outer drum 106 for rotation therewith but are axially move with respect thereto.

Figure 11:
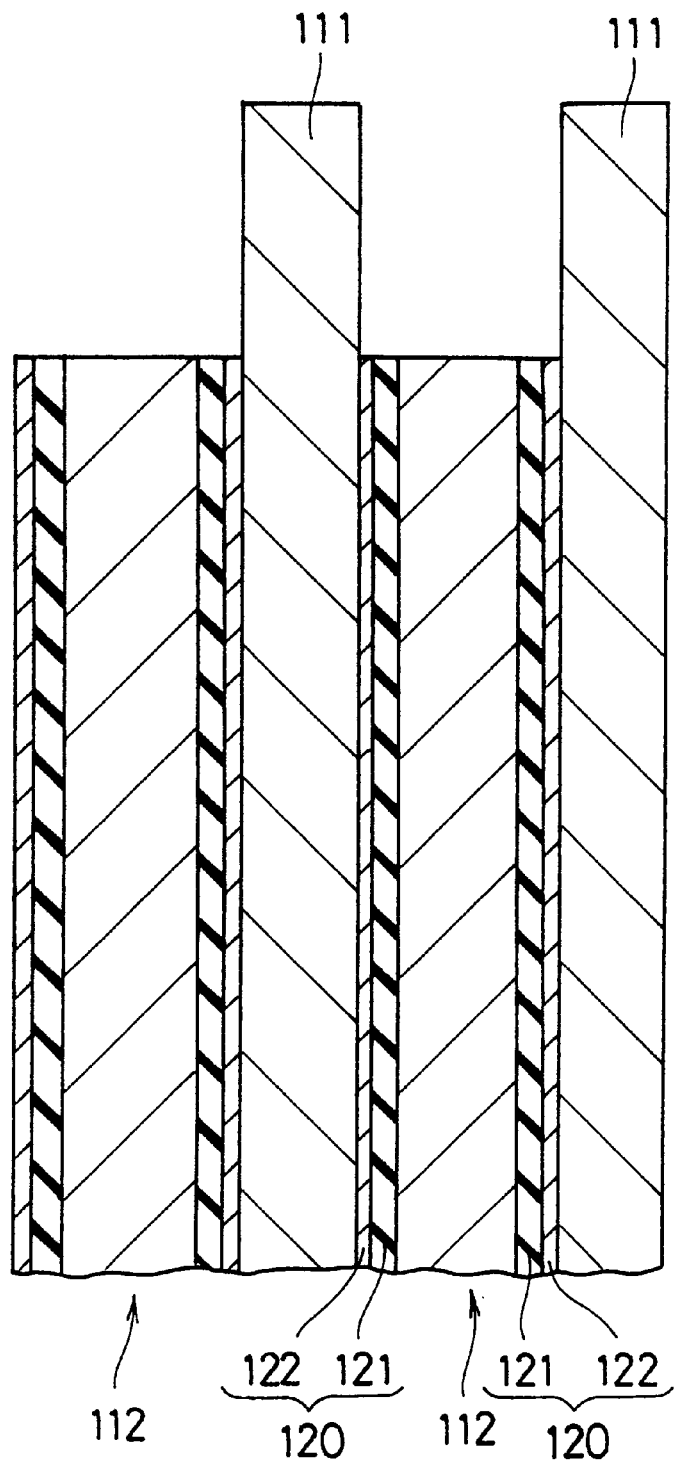
FIG. 11 is a fragmentary, cross section of a portion of the wet multiple plate clutch depicted in FIG. 10, on a slightly enlarged scale.

The plurality of driven plates 112 are arranged axially alternatively with the plurality of drive plates 111. The plurality of driven plates 112 have inner peripheries spline-engaged to the inner drum 107. As shown in FIG. 11, friction coupling portions 120 are fixed to the opposite surfaces of each driven plate 112. The friction coupling portion 120 is formed of a cushioning member 121 made of rubber and a wet friction facing 122 fixed to the cushioning member 121. Thus, a second friction plate is defined by the driven plate 112 (plate member), the cushioning member 121 and the wet friction facing 122.

The piston 109 (operating mechanism) is driven by working oil which is supplied through an oil passage 102a formed in the intermediate shaft 102. The coil spring 110 biases the piston 109 away from the drive and driven plates 111 and 112.

In this embodiment, the cushioning member 121 achieves an effect similar to that of the foregoing embodiments. The material and type of the cushioning member 121 are not restricted similarly to the foregoing embodiments.

The invention can be applied to other wet power transmitting and interrupting mechanism such as a wet brake.

SIXTH EMBODIMENT

Figure 12:
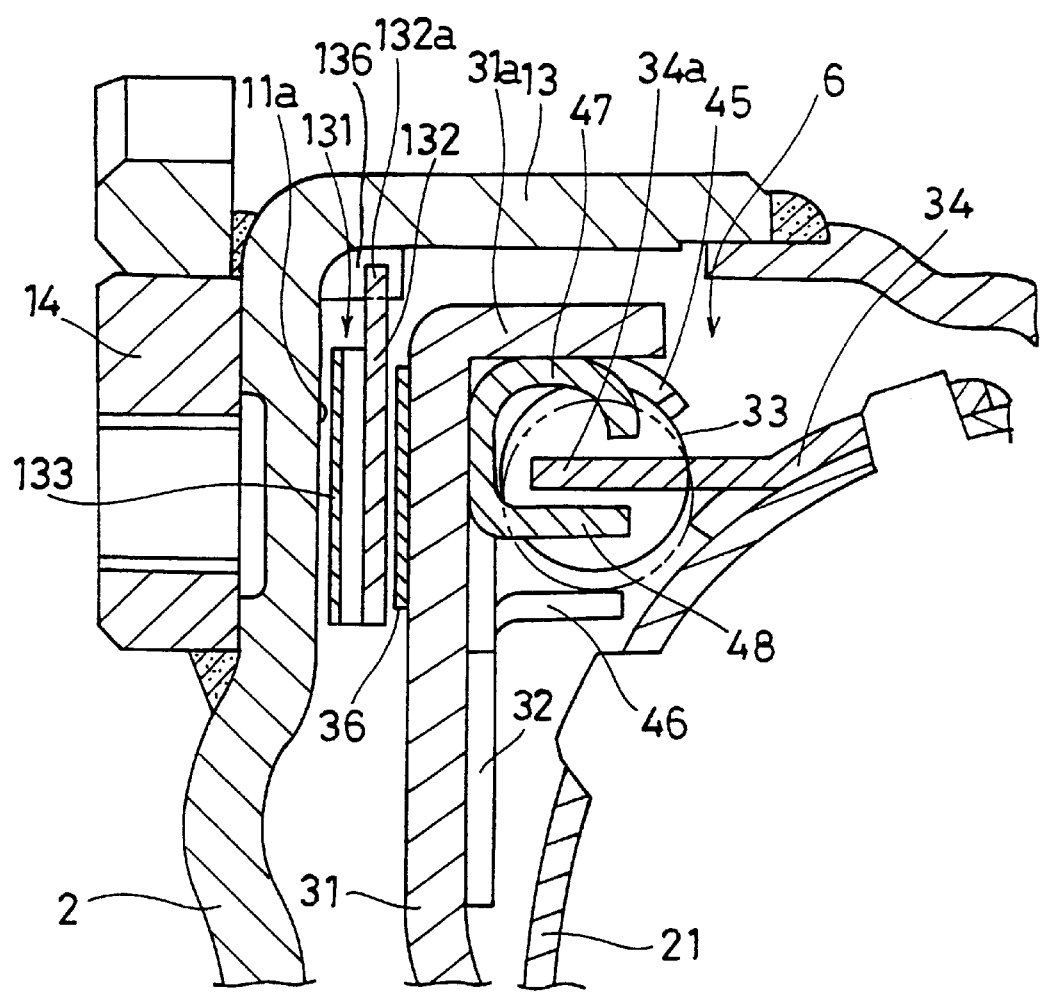
FIG. 12 is a fragmentary cross section of a lockup clutch of a torque convertor in accordance with a sixth embodiment of the present invention.

In the lockup clutch 6 shown in FIG. 12, the piston 31, retaining plate 32, coil springs 33, driven plate 34 and other features are substantially the same as structures and features described above with respect to the first embodiment. Therefore, only those features that differ will be described.

The annular wet friction facing 36 is fixed to an engine side (i.e., left-hand side in FIG. 12 facing the front cover 2) of the radially outer portion of the piston 31. The annularly extending flat friction surface 11a is formed at a side of the front cover 2 opposed to the wet friction facing 36.

The plate 131 is disposed between the wet friction facing 36 and the friction surface 11a. The plate 131 is a member or assembly for providing a cushioning function between the members at the opposite sides thereof. The plate 131 is formed of an annular plate member 132 and a wavy spring 133. The plate member 132 has an axial thickness smaller than that of the front cover body 11 of the front cover 2 and the piston member 31, and thus has a low rigidity. The plate member 132 has a plurality of teeth 132a at its outer periphery. The outer cylindrical portion 13 of the front cover 2 is provided at its portion near the engine with a plurality of convexities 136. The convexities 136 are engaged with a plurality of teeth 132a of the plate member 132, so that the plate member 132 is engaged non-rotatably and axially movably with the front cover 2. For engagement of the plate member 132, a structure other than the above may be employed. The convexities 136 may be formed by drawing the front cover 2, or may be formed by fixing an independent member. The wavy spring 133 is welded to the side of the plate member 131 opposed to the friction surface 11a. In this embodiment, the wavy spring 133 is not fixed to the friction surface 11a. In another example, the wavy spring 133 may be fixed to the side of the front cover, in which case the plate 131 is not disengageable from the front cover 2. The wavy spring 133 functions as a cushioning member having an elasticity in the wet clutch mechanism. Therefore, an effect similar to that of the first embodiment can be achieved.

Further, the plate 131 having the wavy spring 133 (cushioning member) is arranged between the front cover 2 (first rotary member) and the piston member 31 (second rotary member), so that this embodiment has the following advantages in addition to those of the first embodiment.

(1) Since the cushioning member is separated from the wet friction facing, each portion has an improved durability. In particular, the wet friction facing 36 is suppressed from deformation and therefore has an increased lifetime.

(2) Since the cushioning member and the wet friction facing are separated from each other, this facilitates simplified manufacturing.

(3) Since the plate 131 has a lower rigidity than the front cover 2, uniform contact of the wet friction facing can be achieved to a higher extent than the prior art.

Since the plate 131 does not rotate relatively to the front cover 2, the wavy spring 133 is compressed only in the axial direction and is not subjected to a force in the rotating direction. Therefore, the wavy spring 133 can have a prolonged lifetime.

The wavy spring may be replaced with other types of springs, for instance coil springs or a conical spring. The cushioning member may be made of another material such as rubber.

SEVENTH EMBODIMENT

Figure 13:
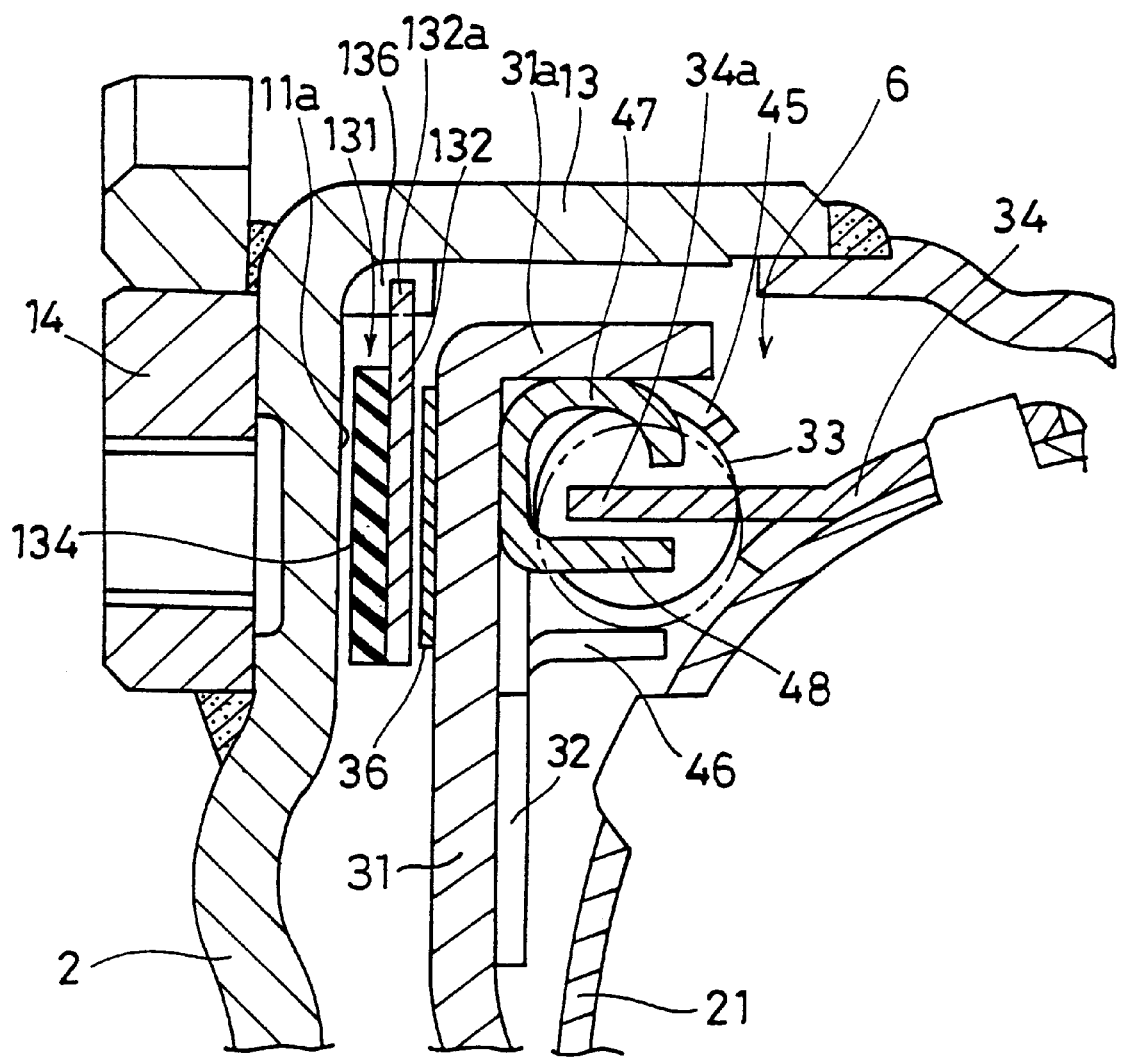
FIG. 13 is a fragmentary cross section of a lockup clutch of a torque convertor in accordance with a seventh embodiment of the present invention.

A lockup clutch 6 shown in FIG. 13 employs an annular rubber member 134 instead of the wavy spring in the sixth embodiment.

EIGHTH EMBODIMENT

Figure 14:
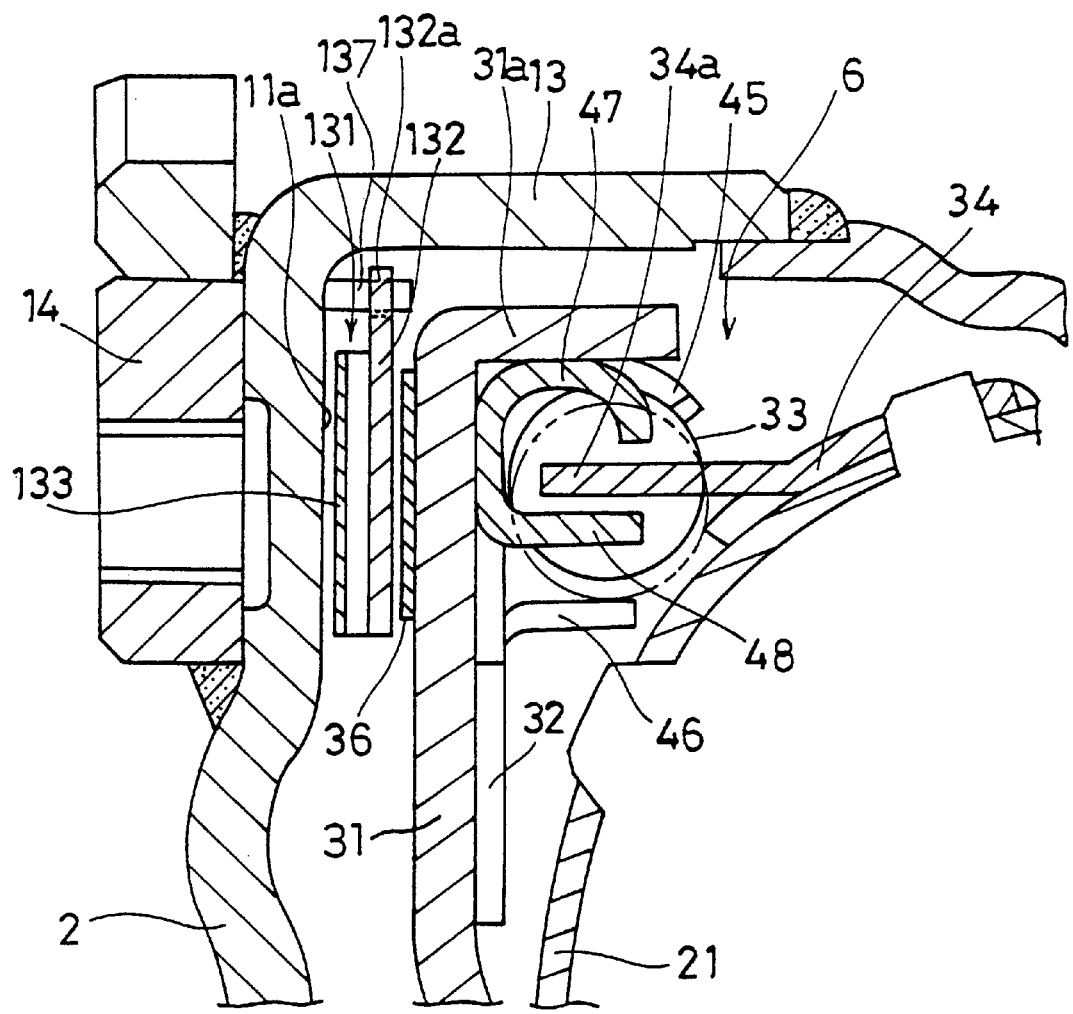
FIG. 14 is a fragmentary cross section of a lockup clutch of a torque convertor in accordance with an eighth embodiment of the present invention.

In the lockup clutch shown in FIG. 14, a plurality of axially extending pins 137 are fixed to the front cover 2. The plate 131 is provided at its outer peripheral portion with apertures or recesses 132a fitted with the pins 137. Thereby, the plate 131 is engaged non-rotatably and axially movably with the front cover 2.

NINTH EMBODIMENT

Figure 15:
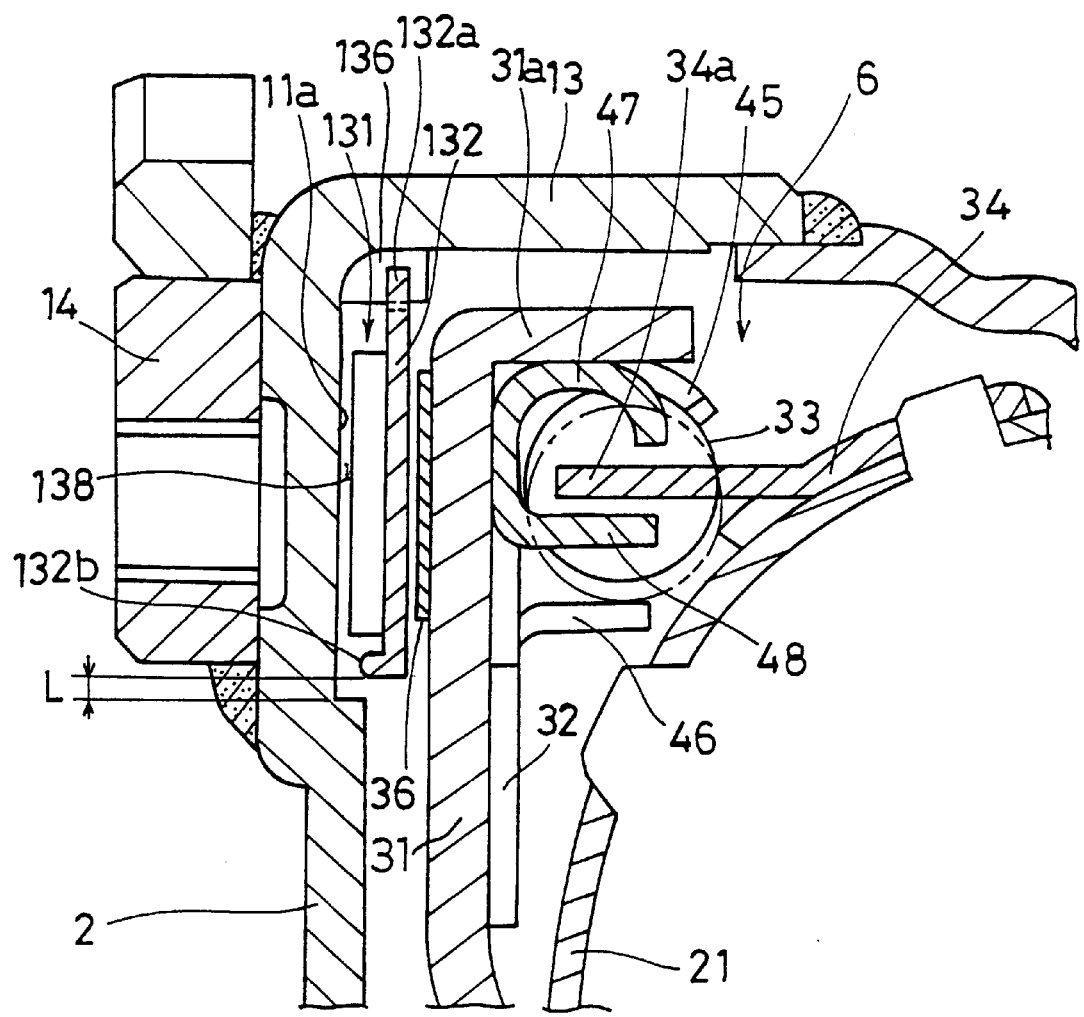
FIG. 15 is a fragmentary cross section of a lockup clutch of a torque convertor in accordance with a ninth embodiment of the present invention.
Figure 16:
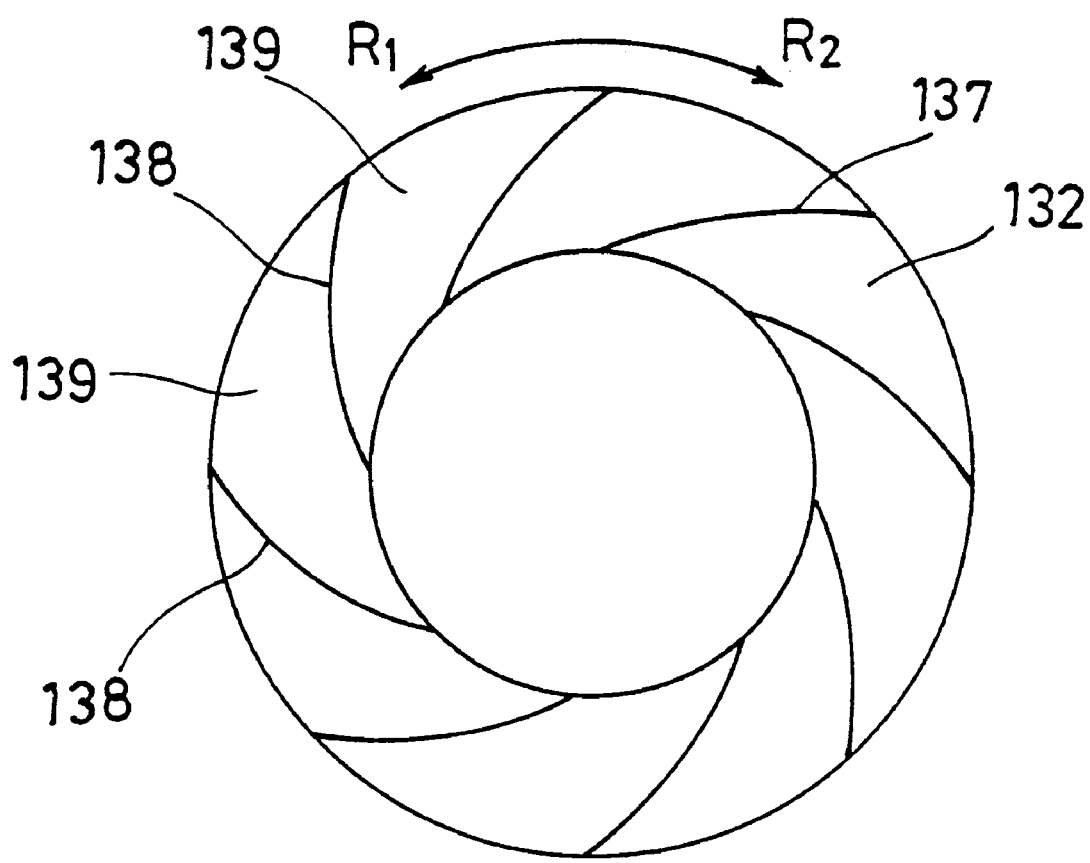
FIG. 16 is a schematic representation of fluid passages in the lockup clutch of the ninth embodiment depicted in FIG. 15.

A lockup clutch 6 shown in FIG. 15 employs a plurality of rubber members 138 fixed to the plate member 132. As shown in FIG. 16, the rubber members 138 extends radially, and fluid passages 139 allowing flow of the working oil are formed between the rubber members 138. Owing to this fluid passages 139, the plate member 132 can be cooled. Therefore, the friction surfaces of the plate member 132 and the wet friction facing 36 can be cooled sufficiently. Consequently, even when sliding occurs between the friction surfaces to a higher extent due to the slip control, the friction surfaces can be cooled sufficiently, and thereby disadvantages due to heat can be suppressed.

Further, each rubber member 138 is spirally curved, and has the radially outer end which is shifted from the radially inner end in the direction R2 reverse to the engine rotating direction. Owing to this arrangement, the working fluid at a radially inner position is forced to flow radially outward. As a result, during slip control, the surface temperature of the wet friction facing 36 controlled and overheating deterred. This further facilitates the slip control of the lockup clutch 6. The response of the lockup clutch 6 when lockup is disengaged is also improved.

The plate member 132 is provided at its inner periphery with an annular projection 132b projecting toward the engine. A small space L is kept between the annular projection 132b and a stepped portion 136 of the front cover 2. This space L facilitates control of a flow rate of the working fluid. As a result, variation of the pressure between the front cover 2 and the piston member 31 is restrained, thereby facilitating the control of the piston member 31.

The fluid passages may be formed by a structure other than that employing the separated rubber members. For example, a single thin rubber member may be arranged over an entire surface of the plate member, and may be provided with a plurality of circumferentially spaced projections. In this case, spaces between the projections form fluid passages.

According to the invention, when the wet friction plate is pressed against another member, the cushioning portion elastically deforms. Therefore, the wet friction facing is brought into substantially uniform contact with another member through its entire surface. Since partial contact is prevented in this manner, partial wear of the wet friction facing is suppressed.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A lockup clutch for mechanically transmitting a torque from an input front cover of a torque converter to an output member comprising:

a piston member disposed adjacent to a front cover of a torque converter housing within said torque converter housing, said piston member being movable toward said front cover in response to changes in hydraulic pressure within said torque converter;

a wet friction facing fixed to a side of said piston member opposed to said front cover; and a clutch assembly having a plate member and a cushioning member fixed to a side of said plate member opposed to said front cover, said plate member extending between said wet friction facing and said front cover, said clutch assembly further including a driven plate connected to a turbine hub of said torque converter, said clutch assembly including a damper mechanism disposed between said plate member and said driven plate which allows for limited relative rotary displacement between said driven plate and said plate member, said plate member being in contact with said piston member for rotation therewith, and said piston member configured for axial movement with respect to said plate member; and a plate in contact with said front cover for rotation therewith, said plate moveable in axial directions with respect to said front cover, said plate extending between said piston member and said plate member for engagement therewith in response to movement of said piston member toward said front cover.

2. The lockup clutch as set forth in claim 1 wherein said cushioning member is made of rubber.

* * * * *